(12) United States Patent
Tucker et al.

(10) Patent No.: US 8,192,571 B2
(45) Date of Patent: Jun. 5, 2012

(54) PLASTIC IMPACT DRIVEN FASTENERS

(75) Inventors: Pamela S. Tucker, Round Rock, TX (US); Nancy Showers, Round Rock, TX (US)

(73) Assignee: Utility Composites, Inc., Round Rock, TX (US)

( * ) Notice: Subject to any disclaimer, the term of this patent is extended or adjusted under 35 U.S.C. 154(b) by 106 days.

(21) Appl. No.: 12/544,109

(22) Filed: Aug. 19, 2009

(65) Prior Publication Data

US 2010/0038015 A1 Feb. 18, 2010

Related U.S. Application Data

(63) Continuation of application No. 10/246,791, filed on Sep. 18, 2002, now Pat. No. 7,581,911.

(51) Int. Cl.
*B29D 30/54* (2006.01)
*B29D 30/56* (2006.01)
*F16B 15/00* (2006.01)

(52) U.S. Cl. ............ 156/96; 156/95; 156/134; 156/155; 156/304.1; 156/304.3; 411/457; 411/458

(58) Field of Classification Search ...................... 156/91, 156/9, 95, 128.1, 130, 92, 134, 96, 155, 304.1, 156/304.3, 304.6, 502; 411/390, 391, 457, 411/458, 476

See application file for complete search history.

(56) References Cited

U.S. PATENT DOCUMENTS

| | | | |
|---|---|---|---|
| 2,357,637 A | 9/1944 | Drypolcher | |
| 2,510,693 A * | 6/1950 | Green | 411/501 |
| 3,112,667 A | 12/1963 | Brentlinger | |
| 3,165,968 A | 1/1965 | Anstett | |
| 3,225,917 A | 12/1965 | Couch | |
| 3,252,569 A | 5/1966 | Matthews | |
| 3,296,048 A | 1/1967 | Wolfe | |
| 3,348,669 A | 10/1967 | Powers | |
| 3,492,907 A * | 2/1970 | Hauck | 411/443 |
| 3,618,447 A | 11/1971 | Goins | |
| 3,813,985 A | 6/1974 | Perkins | |
| 3,853,606 A | 12/1974 | Parkinson | |
| 3,915,299 A | 10/1975 | Miyaoku | |
| 3,936,407 A | 2/1976 | Parkinson | |

(Continued)

FOREIGN PATENT DOCUMENTS

CA 2183545 8/1995

(Continued)

OTHER PUBLICATIONS

"AMODEL® Polythalamide" AMOCO brochure, p. 14, date unknown.

(Continued)

*Primary Examiner* — Richard Crispino
*Assistant Examiner* — Martin Rogers
(74) *Attorney, Agent, or Firm* — Meyertons, Hood, Kivlin, Kowert & Goetzel, P.C.; Eric B. Meyertons

(57) ABSTRACT

Provided in some embodiments is a method that includes coupling portions of one or more members using at least one impact driven fastener. At least one impact driven fastener includes at least one penetrating portion formed of plastic, and at least one head portion having a heat deformation temperature less than about 250° F. Plastic of the penetrating portion provides the penetrating portion with a flexural strength greater than about 9500 psi. The method also includes applying heat to at least partially deform the head portion of at least one fastener.

39 Claims, 6 Drawing Sheets

U.S. PATENT DOCUMENTS

| | | | |
|---|---|---|---|
| 4,206,264 A | 6/1980 | Kurr | |
| 4,240,851 A * | 12/1980 | King | 156/96 |
| 4,456,123 A | 6/1984 | Russell | |
| 4,664,733 A | 5/1987 | Masago | |
| 4,681,497 A | 7/1987 | Berecz | |
| 4,826,381 A | 5/1989 | Kiriyama | |
| 4,863,330 A | 9/1989 | Olez et al. | |
| 4,903,831 A | 2/1990 | Francis | |
| 4,909,690 A | 3/1990 | Gapp et al. | |
| 4,971,503 A * | 11/1990 | Barnell et al. | 411/443 |
| 5,053,089 A * | 10/1991 | Ristich | 152/370 |
| 5,098,940 A | 3/1992 | Brooks | |
| 5,149,237 A | 9/1992 | Gabriel et al. | |
| 5,153,250 A | 10/1992 | Sinclair | |
| 5,314,282 A * | 5/1994 | Murphy et al. | 411/426 |
| 5,441,373 A | 8/1995 | Kish et al. | |
| 5,547,325 A | 8/1996 | Tucker et al. | |
| 5,780,536 A * | 7/1998 | Yokoyama et al. | 524/439 |
| 5,795,121 A | 8/1998 | Tucker et al. | |
| 5,937,486 A | 8/1999 | Bockenheimer | |
| 6,168,362 B1 | 1/2001 | Tucker et al. | |
| 6,207,089 B1 * | 3/2001 | Chuang | 264/135 |
| 7,581,911 B2 | 9/2009 | Tucker et al. | |
| 2004/0045488 A1 * | 3/2004 | Danzik et al. | 108/161 |

FOREIGN PATENT DOCUMENTS

| | | |
|---|---|---|
| WO | 9522697 | 8/1995 |

OTHER PUBLICATIONS

Letter, 3 pages, Jun. 1, 1987, and brochure "KOWA T NAIL" from Marukyo U.S.A., Inc., six pages, printed in Japan, date unknown.

"Resins and Compounds" 10 pages, Modern Plastics, Mid-Oct. 1991.

"Properties of Generic Materials", International Plastics Selector, A30-A33, A56-A-59, 1989.

Information about TREX, TREX web site, www.trew.com/trexdecks/working2.htm, 9 pages, Apr. 21, 1998.

"KOTOKO Integrated Plastic Fastener Maker" Hattori Group, brochure, 15 pages, date unknown.

"Understanding Retreading"; International Tire & Rubber Associatoin Foundation, Inc.; 2001; 15 pages.

"Standard test Methods for Flexural Properties of Unreinforced and Reinforced Plastics and Electrical Insulating Materials"; ASTM Standards, ASTM D790-02; Jun. 2002; pp. 1-9.

"Standard Test Method for Deflection Temperature of Plastics Under Flexural Load in the Edgewise Position"; ASTM Standards, ASTM D648-01; Oct. 2001; pp. 1-12.

Information about GE Plastics; GE Plastics web site, www.geplastics.com/resins/devprod/polymer.html; Aug. 2002; 3 pages.

Information about acrylonitrile-butadiene-styrene (ABS); efunda web site, www.efunda.com; Aug. 2002; 2 pages.

"Bayblend® FR-2000-Data Sheet"; Amco Plastic Material Inc. website, www.amco.ws; Aug. 2002; 2 pages.

"Mechanical Properties Flexural Properties"; Dow web site, www.dow.com; Aug. 2002; 1 page.

"Flexural Strength Testing of Plastics"; MatWeb site, www.matweb.com; Aug. 2002; 1 page.

"PolyOne Geon® M3000 Vinyl Compound-Rigid (RPVC)"; Online Material Data Sheet; MatWeb site, www.matweb.com; Aug. 2002; 2 pages.

"Solvay Advanced Polymers AMODEL® A-1145 HS Polyphthalamide (PPA) Resin, 45% Glass Reinforced, at 50% RH"; Online Material Data Sheet; MatWeb site, www.matweb.com; Aug. 2002; 2 pages.

"PlastxWorld CEVIAN® SERG1 10% GF ABS"; Online Material Data Sheet; MatWeb site, www.matweb.com; Aug. 2002; 2 pages.

"BP Amoco Barex® 210 E Acrylonitrile-Methyl Acrylate Copolymer"; Online Material Data Sheet; MatWeb site, www.matweb.com; Aug. 2002; 2 pages.

"GE Plastics Ultem® 1000 PEI, Polyetherimide, unfilled, extruded"; Online Material Data Sheet; MatWeb site, www.matweb.com; Aug. 2002; 2 pages.

* cited by examiner

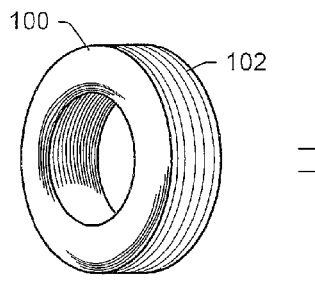
Fig. 1a
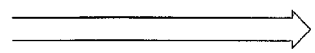
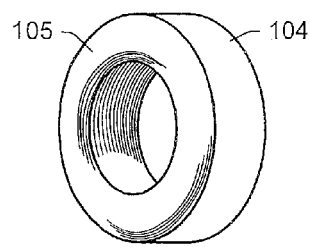
Fig. 1b
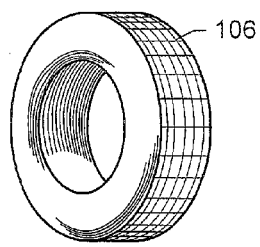
Fig. 1c
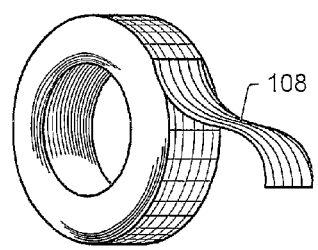
Fig. 1d
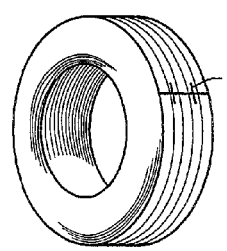
Fig. 1e
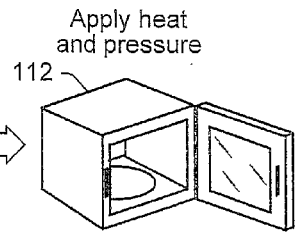
Fig. 1f
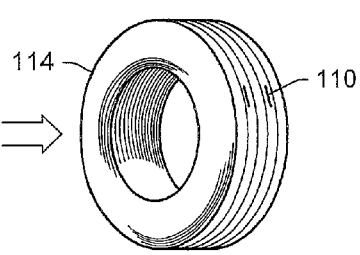
Fig. 1g
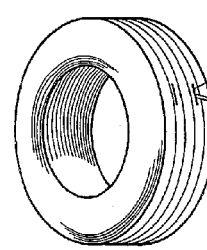
Fig. 1h
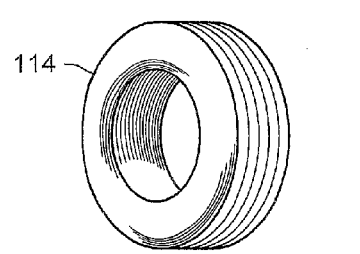
Fig. 1i

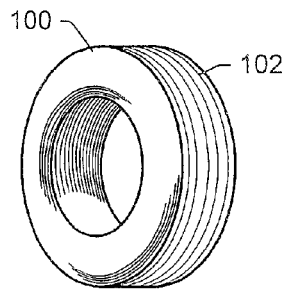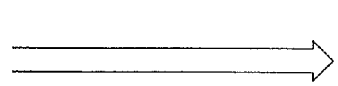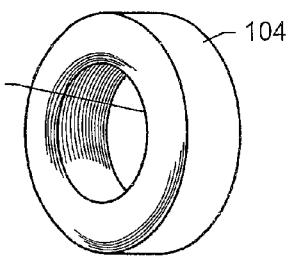
Fig. 2a　　　　　　　　　　　Fig. 2b
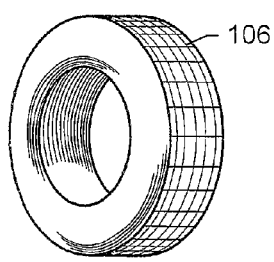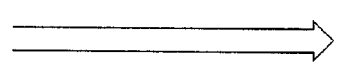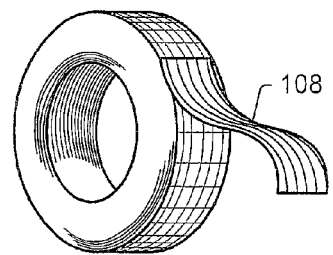
Fig. 2c　　　　　　　　　　　Fig. 2d
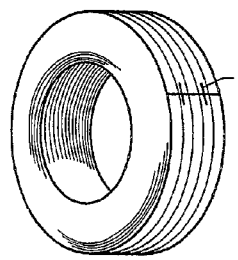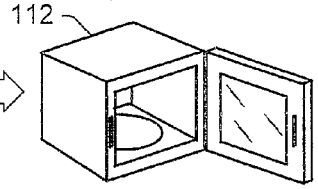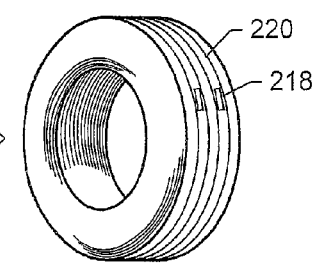
Fig. 2e　　　　　Fig. 2f　　　　　Fig. 2g Table 1

| Sample | Tradename | Polymer | Temperature (°F) A | B | C | Flexural Strength (kPsi) | Heat Deflection Temp. (°F) | Test 1 Results | Test2 Results |
|---|---|---|---|---|---|---|---|---|---|
| 1 | Geon® M3000 | rigid PVC | 180 | 420 | 90 | 13.3 | 162 | 89 | 93 |
| 2 | Unichem® 01-713 | PVC | 180 | 420 | 90 | NA | 160 | 0 | not tested |
| 3 | Unichem® 01-713A | PVC | 180 | 420 | 90 | 9.5 | 185 | 65 | 98 |
| 4 | Unichem® 01-713B | PVC | 180 | 420 | 90 | NA | 190 | 100 | 98 |
| 5 | Amodel® A1145HSNT | PPA w/ glass fiber | 250 | 610 | 210 | 43 | 549 | 100 | 100 |
| 6 | Cycolac® V100 | ABS | 180 | 420 | 90 | 10.5 | 162 | 100 | 79 |
| 7 | Bayblend® FR2000 | PC/ABS blend | 180 | 440 | 90 | 13.8 | 180 | 100 | 81 |
| 8 | Cevian® Serg1 | ABS w/glass fiber | 180 | 420 | 90 | 12.8 | 201 | 100 | 91 |
| 9 | Lustran® ABS 248-4000 | ABS | 180 | 420 | 90 | 10.7 | 187 | 100 | 83 |
| 10 | Cycolac® XFR15 | ABS reinforced | 180 | 420 | 90 | 10.2 | 160 | 78 | 80 |
| 11 | Cycolac® V100 + Capa® 6800 | ABS+PE | 180 | 400 | 90 | 10.5 | 155 | 100 | 67 |
| 12 | Cycolac® MG94 | ABS | 180 | 420 | 90 | 11.5 | 180 | 100 | 88 |
| 13 | Ultem® 1000 | Polyetherimide | 250 | 670 | 200 | 22 | 392 | 100 | 100 |
| 14 | Barex® 210 | Acrylonitrile-Methyl Acrylate Copolymer | 170 | 380 | 140 | 14 | 151 | 100 | 72 |

FIG. 4

PLASTIC IMPACT DRIVEN FASTENERS

PRIORITY CLAIM

This application is a continuation of U.S. patent application Ser. No. 10/246,791 entitled "Plastic Impact Driven Fasteners" to Pamela S. Tucker and Nancy Showers, filed on Sep. 18, 2002, now U.S. Pat. No. 7,581,911 the entirety of which is incorporated by reference.

BACKGROUND OF THE INVENTION

1. Field of the Invention

Embodiments disclosed herein generally relate to impact driven fasteners. More specifically, embodiments relate to polymeric impact driven fasteners.

2. Description of the Relevant Art

In certain tire retread processes, impact driven fasteners may be used to hold new tire tread in place during an assembly and curing process. These fasteners have traditionally been metal staples. After the assembly and curing process has been completed, the impact driven fasteners are removed. Removing the impact driven fasteners is intended to provide a good aesthetic appearance of the tire, and to satisfy the customer perception that the fasteners installed for processing purposes do not damage the tire during use (e.g., while on an vehicle).

Plastic impact driven fasteners are known for use in certain processes. For example, fasteners for use in wood assembly processes (e.g., furniture construction, woodworking, boat building, etc.) are known. Some plastic impact driven fasteners have been formed as substantially direct replacements for existing impact driven fasteners (e.g., nails, staples, etc.). In either case, plastic impact driven fasteners have typically focused on providing adequate penetration into the fastened material(s) and the durability of the fasteners.

SUMMARY OF THE INVENTION

Embodiments disclosed herein include a plastic impact driven fastener or fastener pack having relatively high flexural strength and relatively low heat deformation temperature. For example, a fastener may have a flexural strength greater than about 9500 psi. In some embodiments, a fastener may have a flexural strength greater than about 10,000 psi. In still other embodiments, a fastener may have flexural strength greater than about 12,000 psi. Such fasteners may be formed and configured to penetrate a surface having a durometer hardness greater than about 35A. In some embodiments, such fasteners may be formed and configured to penetrate a surface having a durometer hardness greater than about 60A. In still other cases, such fasteners may be formed and configured to penetrate a surface having a durometer hardness greater than about 80A.

Additionally, fasteners disclosed herein may have a heat deformation temperature sufficiently low that heat and pressure applied during a curing step of a tire retread process, may deform portions of the fasteners. For example, such fasteners may have a heat deformation temperature of less than about 250° F. In another example, such fasteners may have a heat deformation temperature of less than about 200° F. In still other examples, such fasteners may have a heat deformation temperature of less than about 180° F., or less than about 160° F.

Plastic impact driven fasteners may be used in a process to assemble two or more members together. For example, the members may be coupled using one or more impact driven fasteners. Heat may be applied to at least a portion of one member, and to at least one fastener. Additionally, pressure may be applied to at least a portion of at least one member and to at least one fastener. The applied heat and pressure may be sufficient to deform at least a portion of at least one fastener.

An example of such a process may include a tire retread process. In a tire retread process, a coupling layer may be applied to a tire core. A pre-cured tire tread may be applied over the coupling layer. Ends of the pre-cured tire tread may be secured using at least one plastic impact driven fastener. The assembled tire may be subjected to a curing process to cure the coupling layer. The curing process may deform at least a portion of at least one fastener.

One or more fasteners used in such a process may not require removal from the tire after processing. Thus, a tire processed by such a method may include portions of one or more plastic impact driven fasteners.

BRIEF DESCRIPTION OF THE DRAWINGS

Other objects and advantages of the invention will become apparent upon reading the following detailed description and upon reference to the accompanying drawings in which:

FIG. 1 depicts a schematic flow diagram of a typical tire retread process;

FIG. 2 depicts a schematic flow diagram of a tire retread process according to one embodiment;

FIG. 4 depicts results of several experiments in tabular form;

Figure 3:
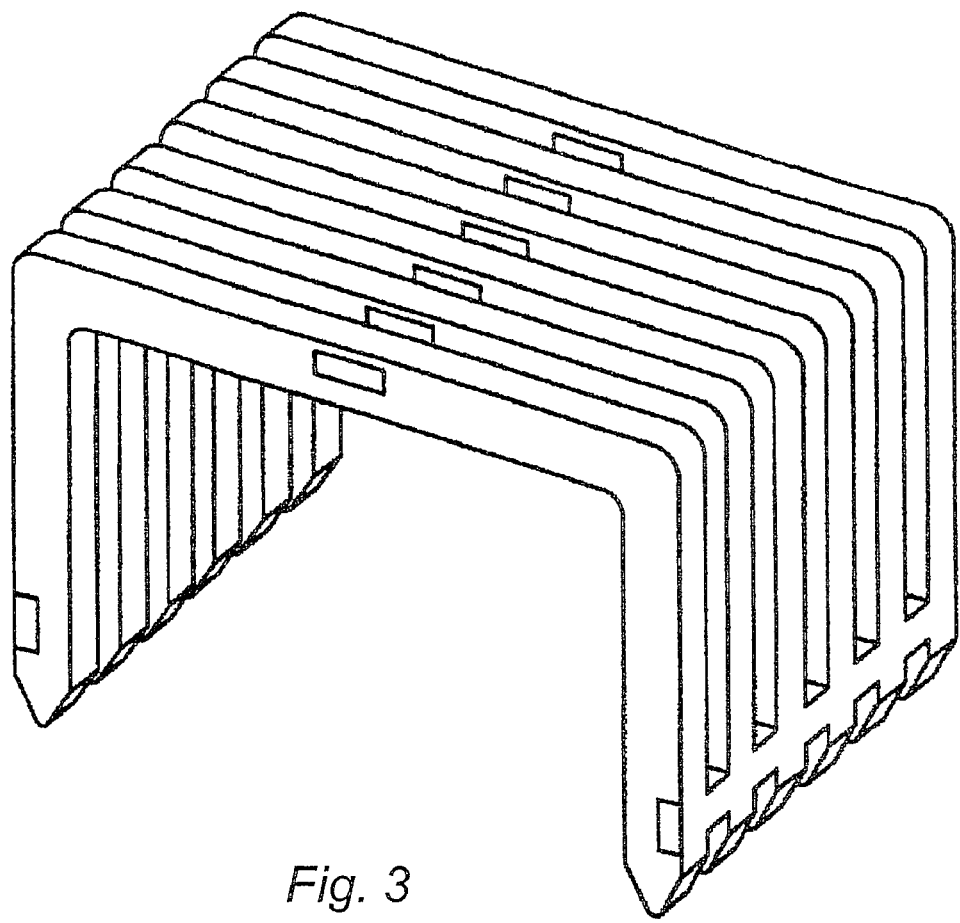
FIG. 3 depicts a side perspective view of an embodiment of a plastic impact driven fastener pack.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Embodiments disclosed herein relate to impact driven fasteners. More specifically, embodiments relate to plastic impact driven fasteners having relatively high flexural strength and relatively low heat deformation temperature. Such fasteners may be useful in applications where a traditional fastener is installed temporarily, then removed after a heating step. For example, in certain tire retreading processes, as described in more detail below, a fastener may be used to hold a tire tread in place during a heat and pressure curing step. Traditional fasteners used in such processes are generally removed after the curing step. In an embodiment, fasteners having relatively high flexural strength and relatively low heat deformation temperature may not require removal after the curing step.

Plastic fasteners and methods of manufacturing plastic fasteners are described in U.S. Pat. Nos. 6,168,362 to Tucker et al., 5,547,325 to Tucker et al. and 5,795,121 to Tucker et al., each of which is incorporated by reference as though fully set forth herein.

Referring to FIGS. 1a through 1i, a flow diagram of a tire retreading process is shown. FIGS. 1a though 1i represent stages in the retread process. In a receiving stage, shown in FIG. 1a, a tire 100 is received by a retreading facility. Typically, tire 100 may have relatively worn tread 102 due to use. Worn tread 102 may be removed from tire 100 during a buffing stage, as shown in FIG. 1b. For example, the buffing stage may be accomplished by use of a buffing lathe, which spins the tire while a rasp removes worn tread 102. After removal of worn tread 102, the remaining bare tire may generally be referred to as a "tire core" 105.

As depicted in FIG. 1c, a coupling layer 106 may be applied to tire core 105 after buffing. As used herein, a "coupling layer" may include, but is not limited to: a monomer, a polymerized composition or a partially polymerized composition. In particular retread processes, coupling layer 106 may include a polymerized or partially polymerized strip of material that may be further cured to induce cross-linking between the tire core and the tread.

Tread 108 may be applied to tire core 105 during a tread application stage, as shown in FIG. 1d. In certain retread processes, tread 108 may be applied in a strip. In such processes, the strip of tread may be secured to tire core 105 by fasteners 110, as shown in FIG. 1e. For example, fasteners 110 may include staples. In such a case, the ends of the strip of tread may be stapled to each other. Such retread processes typically use metal staples to couple the ends of the tread. In some instances, however, problems may arise from use of metal staples to secure a tire tread. For example, staple removal may be labor intensive. Additionally, worker injury (e.g., cuts to the hand) may occur as a result of staple removal processes. Additionally, metal staples littering the floors of retread shops may puncture vacuum envelopes used in the curing process thereby increasing the number of tires that must be re-processed. Metal staples on retread shop floors may also present a risk of worker injury. In an embodiment, plastic impact driven staples may be used to secure the ends of tire tread 108.

With tread 108 secured, the tire may be subjected to a curing process to cure coupling layer 106, as shown in FIG. 1f. For example, a vulcanization process may be used. Curing process 112 may typically involve applying heat and, pressure to the tire. For example, in certain retread processes the tire may be wrapped in a sealing envelope. The sealing envelope may be vacuum sealed, thereby applying pressure to the tire. The tire, in the sealing envelope, may then be placed in a curing chamber. The curing chamber may apply further pressure to the tire. Additionally, the tire may be heated. The combination of heat and pressure applied to the tire may initiate curing of coupling layer 106. In a typical curing process, the process chamber temperature may have a set point in the range about 200° F. to about 290° F. In a typical curing process, the curing chamber pressure may have a set point in the range of about 10 psi to about 200 psi.

After a period of time, typically a number of hours, the tire may be removed from curing chamber 112, as shown in FIG. 1g. After curing, tire core 105 and tread 108 are securely coupled together by the cured coupling layer forming a complete tire 114. However, fasteners 110 remain in tire 114. Therefore, tire 114 may go through a fastener removal stage, as shown in FIG. 1h. At the fastener removal stage, fasteners 110 may be removed using a removal tool 116. Removal of fasteners 110 may be problematic in some cases. For example, fastener removal tool 116 may accidentally damage tire 114. Another problem that may arise is that an operator removing staples may be injured. For example, the operator may cut his or her hand with the staple removal tool or a metal staple. After removal of fasteners 110, processing of tire 114 is complete, as depicted in FIG. 1i. Other stages and/or process steps may be included in a tire retread process as well, including but not limited to: inspections processes, tire core selection, tire core repair, etc.

Referring now to FIGS. 2a through 2g, an embodiment of an improved tire retread process is depicted. In the embodiment depicted in FIGS. 2a through 2g, the stages depicted in FIGS. 2a through 2d may proceed in the same manner as the stages depicted in FIGS. 1a through 1d. That is, a tire 100 may be selected for retreading. Old tread 102 may be removed from tire 100 to form a smooth surface 104 on tire core 105. A coupling layer 106 may be applied to tire core 105, and tire tread 108 maybe placed over coupling layer 106.

However, as depicted in FIG. 2e, one or more plastic impact driven fasteners 210 may be used to secure tread 108 during the tread application stage. In an embodiment, plastic fasteners 210 may be directly interchangeable with metal fasteners 110. That is, an impact fastener driving device used to drive metal fasteners 110 may be used without modification to drive plastic fasteners 210. In other embodiments, an impact fastener driver specially adapted for plastic fasteners 210 may be used. Plastic impact driven fasteners 210 may be formed to at least partially penetrate tire tread 108. Thus, fasteners 210 may have flexural strength sufficient to inhibit buckling or crushing of fasteners 210 during driving of fasteners 210 into tread 208. Additionally, while fasteners 210 may have sufficient flexural strength to at least partially penetrate tread 208 when driven at relatively high speeds (e.g., by an impact fastener driving device), they may not have sufficient flexural strength to penetrate tire core 105 at relatively low speeds (e.g., during normal use of the tire).

After tread 208 is secured, tire core 105, tread 108 and coupling layer 106 may be prepared for a curing process 112 as previously described. Specifically, they may be sealed in a sealing envelope. The sealing envelope may be vacuum sealed, thus applying pressure to tire core 105, tread 108, coupling layer 106 and fasteners 210. Coupling layer 106 may be cured by application of heat or applications of heat and additional pressure, as depicted in FIG. 2f. In an embodiment, plastic fasteners 210 may be deformed by heat and pressure applied during curing process 112. For example, at least a portion of at least one of fasteners 210 may be melted by the applied heat. Alternately, at least a portion of at least one of fasteners 210 may be softened sufficiently by the applied heat for the applied pressure to flatten exposed portions of the fastener(s). In certain embodiments, heat and pressure applied during curing process 112 may also cause a head portion of at least one fastener 210 to separate from a penetrating portion of the fastener. Additionally, in some embodiments, heat and pressure applied during curing process 112 may be sufficient to soften a penetrating portion of at least one fastener 210. In an embodiment, no changes may be required in curing process 112 as a result of using plastic fasteners 210. In alternate embodiments, curing process 112 may be modified for use with plastic fasteners 210. For example, heat and/or pressure applied during curing process 112 may be adjusted to facilitate use of plastic fasteners 210.

After curing, tire 220 may be complete, as depicted in FIG. 2g. In an embodiment, there may be no need to remove exposed portions 218 of the deformed fasteners from tire 220. Exposed portions 218 of the deformed fastener may separate from penetrating portions of the fasteners by normal use of tire 220. Alternately, if there is a desire to remove exposed portions 218 of deformed fasteners (e.g., to improve the appearance of tire 220), the exposed portions may be removed by hand or otherwise without the need to penetrate or pry against tire 220. In an embodiment, penetrating portions of fasteners 210 may be left in tire 220 without substantial risk of damaging tire 220. In such embodiments, the penetrating portion of the fasteners may wear down as the tire tread wears down.

Additionally, fasteners 210 may be formed such that the color of the fasteners substantially matches the color of tread 108. For example, fasteners 210 may be black since most tire tread is black. In another example, only penetrating portions of fasteners 210 may be black since they may remain in completed tire 220. In such a case, head portions of fasteners 210 may be any color as selected for a desired affect. In still another example, fasteners 210 may be any color before curing process 112; however, application of heat or application of heat and pressure may cause at least a portion of fastener 220 to change color to substantially match the color of tread 108.

As previously mentioned, in various embodiments, a plastic impact driven fastener may be configured to operate with a standard impact driving device. Such fasteners may typically be formed or assembled in fastener packs. An example of a typical fastener pack is depicted in FIG. 3. Alternately, a plastic impact driven fastener or fastener pack may be configured to operate with a non-standard impact driving device. Geometric considerations for forming fasteners and fastener packs, are discussed in U.S. Pat. Nos. 6,168,362 to Tucker et al., 5,547,325 to Tucker et al. and 5,795,121 to Tucker et al.

In an embodiment, a plastic impact driven fastener may be formed using conventional methods of molding and/or shaping plastics. A composition used to form a plastic impact driven fastener may include one or more reinforcement materials. Examples of common reinforcement materials include, but are not limited to: glass fiber, beads, other silica based fillers, asbestos, polymeric fibers, metal fibers, mineral filters, boron fibers, carbon fibers and synthetic organic fibers. The composition may also include other additives to modify manufacturing characteristics and/or fastener characteristics.

Methods as described above and/or other methods may be selected depending upon materials used to form the fasteners. Suitable materials may be selected such that completed fasteners have relatively high flexural strength and relatively low heat deformation temperature. For example, for use in a tire retread process, a fastener should have sufficient flexural strength to at least partially penetrate tire tread. A typical automobile tire tread may have a durometer hardness (type A) of about 35 to about 80 standard units. In an embodiment, a fastener may have a flexural strength greater than about 9500 psi. In some embodiments, a fastener may have a flexural strength greater than about 10,000 psi, or even 12,000 psi. As used herein, "flexural strength" has its ordinary meaning in the art and may be measured by known methods, such as but not limited to ASTM test method D790-02 entitled "Standard Test Method for Flexural Strength Properties of Unreinforced and Reinforced Plastics and Electrical Insulating Materials," which is incorporated by reference as though fully set forth herein.

In addition to relatively high flexural strength, a plastic impact driven fastener as disclosed herein may have relative low heat deformation temperature. As used herein, "heat deformation temperature" has its ordinary meaning in the art and may be measured by known methods such as, ASTM test method D648-01 entitled "Standard Test Method for Deflection Temperature of Plastics Under Flexural Load in the Edgewise Position," which is incorporated by reference as though fully set forth herein. In particular, heat deformation temperatures discussed herein refer to deformation temperatures under approximately 264 psi load. A fastener may have a sufficiently low heat deformation temperature to allow a desired amount of deformation of the fastener during a heat application process or heat and pressure application process. As used herein, "deformation" refers to a change in the shape of an object.

Testing was conducted to determine materials suitable for use in forming fasteners as described above. In a particular series of tests, a number of polymers were used to form staples. The polymers included polymers having a crystalline component and polymers that had no crystalline component. Test samples included one or more polymers or copolymers of polyvinyl chloride, poly(acrylonitrile), poly(butadiene), poly(styrene), poly(ethylene), and/or poly(methyl acrylate). Although the tested polymers, copolymers and polymer blends were generally thermoplastics, it is recognized that certain thermoset polymers may also be suitable for use as fasteners having high flexural strength and relatively low heat deformation temperature. In the case of thermoset polymers, the heat deformation temperature may refer to the temperature at which thermal degradation of the polymer is sufficient to allow the polymer sample to be deformed by an applied pressure. Suitable thermoset polymer formulations may be determined through a testing regimen similar to the one described below regarding thermoplastic polymers.

The staples in the test samples were tested for ribber penetration and heat deformation properties as described below. Results of the tests are given in Table 1, which is shown in FIG. 4.

For each sample, the polymer pellets were dried in a forced-air convection oven at temperature A, as listed in column A of Table 1. The pellets were injection molded at a melting point of approximately temperature B and a mold temperature of temperature C, as listed in columns B and C of Table 1, respectively. The formed staples were then conditioned at room temperature and ambient humidity for at least 24 hours. After conditioning, the staples were subjected to two tests. Table 1 also reports the flexural strength and heat deformation temperature at 264 psi of each material as tested or reported by the material's manufacturer.

In Test 1, staples were loaded into a pneumatic stapler with compressed air supplied at about 90 psi. The staples were driven into a pre-cured rubber tread. The tread had a durometer hardness of about 63 standard units. The percentage of staples that successfully penetrated the tread is reported in Table 1, in the "TEST 1" column. For testing purposes, successful penetration was defined as penetration of the tread without breakage or folding of either leg of the staple.

In Test 2, individual staples were put into an oven set at 212° F. for 4 hours. It is believed that this temperature and time may be suitable to simulate a tire retread curing stage. Deformation of the staples was measured after heating. The deformation was measured by comparing the length of the crown of each staple after heating to the length of the crown before heating. Results of the second test are reported in Table 1 in the "TEST 2" column. The results are expressed as a percentage of the original length retained after heating. Therefore, a lower number indicates greater deformation.

Figure 5:
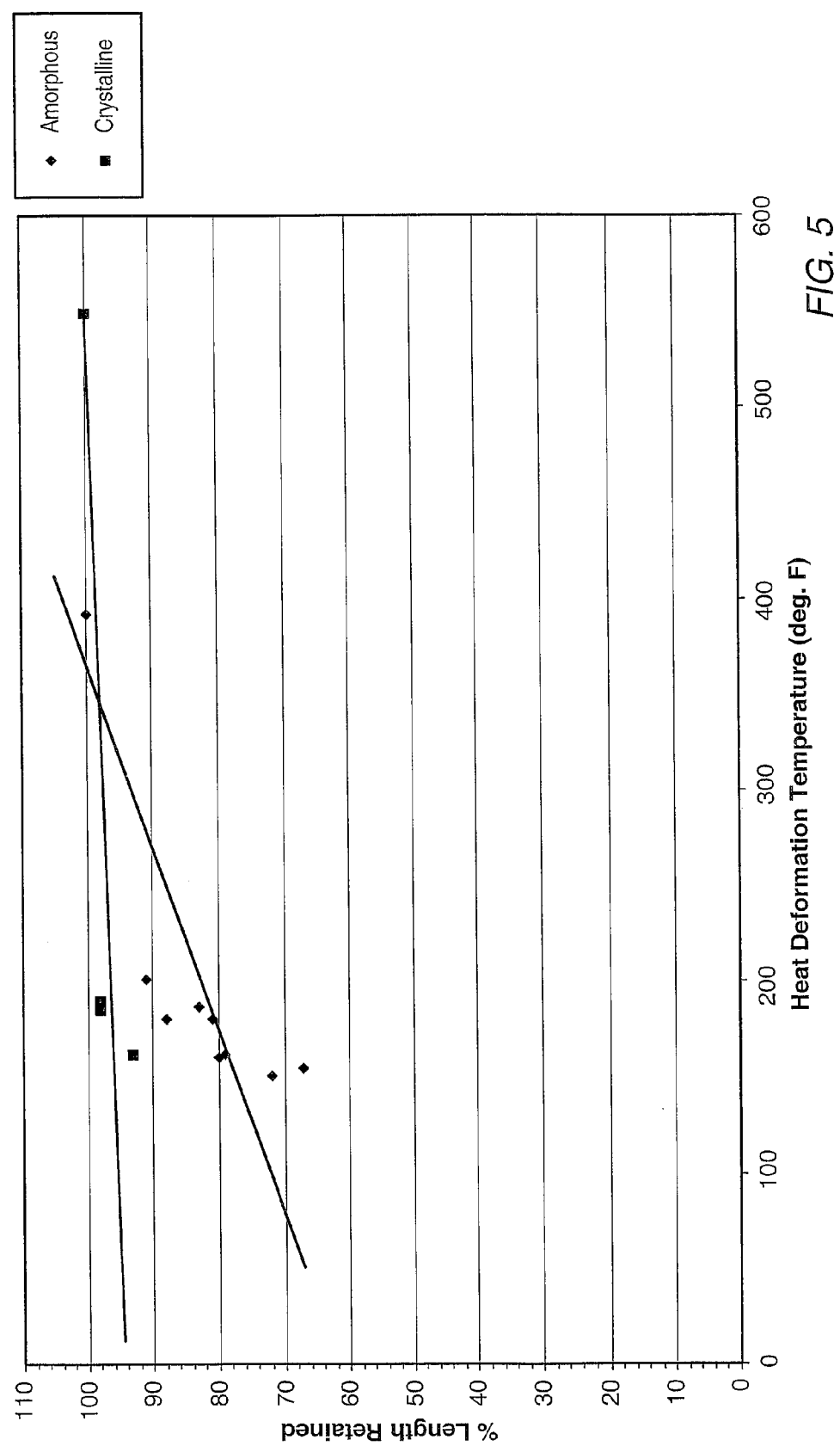
FIG. 5 depicts a graph of results of several experiments relating heat deformation temperature to percent length retained.

FIG. 5 depicts a graph correlating reported heat deformation temperature with percent length retained. Line 502 corresponds to a line fit estimated through data points for various amorphous polymers. Line 504 corresponds to a line fit estimated through data points for various crystalline polymers. As is seen with reference to line 502, a 93% length retained corresponds approximately to a crystalline polymer having a heat deformation temperature of about 150° F. Amorphous polymers do not exceed 93% length retained until approximately a heat deformation temperature of about 202° F. As used herein, an "amorphous" polymer refers to a polymer that does not have a substantially crystalline component. As used herein, a "crystalline" polymer refers to a polymer which has a substantial crystalline component.

Figure 6:
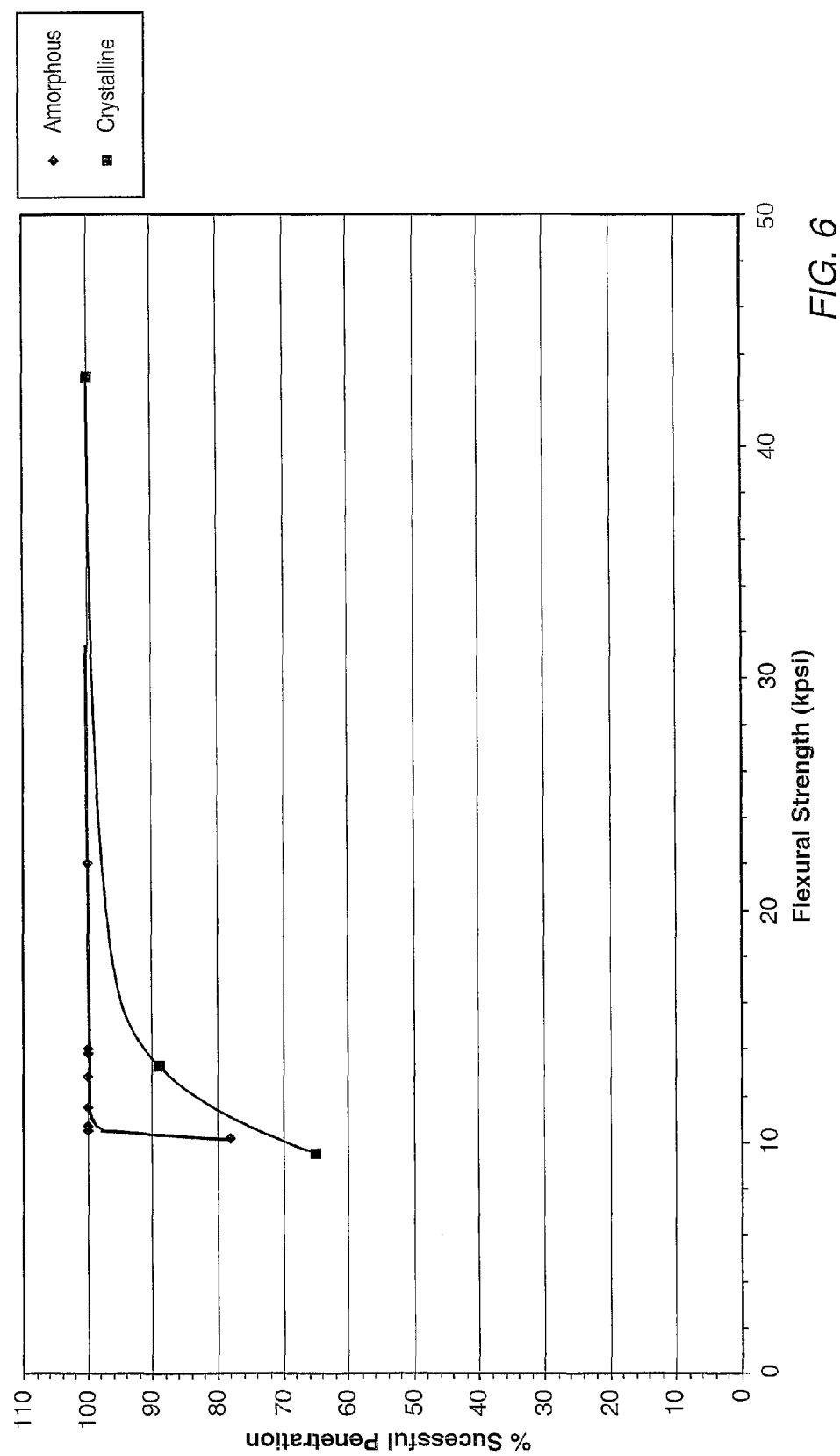
FIG. 6 depicts a graph of results of several experiments relating flexural strength to percent penetrations of a fastener.

FIG. 6 depicts a graph correlating reported flexural strength with successful penetration percentage. In FIG. 6, line 602 corresponds to results from various amorphous polymer compositions. Line 604 corresponds to results from various crystalline polymer compositions. As seen on line 604 a crystalline polymer with a flexural strength of about 10,000 psi may have a successful penetration rate of about 75%. It is further noted, based on line 604, that a crystalline polymer having a flexural strength as low as about 9500 psi may provide successful penetration at least some portion of the time. As can be seen with reference to line 602, an amorphous polymer may have a successful penetration rate of about 75% with a flexural strength of about 10,000 psi.

Based on the results shown in FIG. 4, FIG. 5 and FIG. 6, it is expected that fasteners formed from polymer samples 1, 6, 7, 8, 9, 10, 11 and 14 may perform suitably well. Additionally, other amorphous polymer compositions having a flexural strength greater than about 10,000 psi and a heat deformation temperature less than about 392° F. may perform suitably well. Crystalline polymer compositions having a flexural strength greater than about 9500 psi and a heat deformation temperature less than or equal to about 160° F. may also perform suitably well. For example suitable fasteners may be formed of polymers, copolymers and/or polymer blends including, but not limited to: poly(methyl methacrylate), polyvinyl chloride, poly(acrylonitrile), poly(butadiene), poly(styrene), poly(ethylene), and/or poly(methyl acrylate).

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

While the present invention has been described with reference to particular embodiments, it will be understood that the embodiments are illustrated and that the invention scope is not so limited. For example, fasteners disclosed herein may be used for other processes where a relatively high flexural strength and relatively low heat deformation temperature fastener is desired. Other variations, modifications, additions and improvements to the embodiments described are possible. These variations, modifications, additions and improvements may fall within the scope of the invention as detailed within the following claims.

What is claimed is:

1. A method of retreading a tire, comprising:
   providing one or more tire tread portions having a first end and a second end configured to be coupled to one another;
   coupling the first end and the second end to one another using at least one impact driven fastener,
      wherein the impact driven fastener comprises a staple having two or more penetrating portions coupled to one another via a head portion,
      wherein a first penetrating portion is disposed in the first end of the one or more tire tread portions and a second penetrating portion is disposed in the second end of the one or more tire tread portions;
      wherein the first and second ends are coupled to one another via at least the head portion of the staple;
      wherein the at least two penetrating members are formed of plastic having a flexural strength greater than about 9500 psi;
      wherein the head portion is formed of a plastic having a heat deformation temperature less than about 250° F.; and
      wherein the head portion of the impact driven fastener is configured to at least partially soften when heated to about the heat deformation temperature during a tire retreading process; and
   applying heat to at least partially soften at least a portion of the impact driven fastener.

2. The method of claim 1, further comprising vulcanizing the tire such that tire tread is securely coupled to a tire core.

3. The method of claim 1, wherein applying heat to at least partially soften the impact driven fastener comprises heating at least a coupling layer to a temperature greater than about 180° F.

4. The method of claim 1, wherein applying heat to at least partially soften the impact driven fastener comprises heating at least a coupling layer to a temperature greater than about 220° F.

5. The method of claim 1, wherein applying heat to at least partially soften the impact driven fastener comprises applying heat to a tire core, tire tread, a coupling layer, and one or more impact driven fasteners.

6. The method of claim 1, wherein, during application of heat to at least partially soften the impact driven fastener, the heat applied is sufficient to cause at least a portion of at least one impact driven fastener to substantially conform to a surface of tire tread.

7. The method of claim 1, wherein, during application of heat to at least the coupling layer, the heat applied is sufficient to cause at least a portion of at least one impact driven fastener to at least partially spread over a surface of tire tread.

8. The method of claim 1, further comprising applying pressure to at least partially soften the impact driven fastener.

9. The method of claim 1, further comprising applying pressure greater than about 50 psi to at least partially soften the impact driven fastener.

10. The method of claim 1, wherein at least one impact driven fastener comprises at least one penetrating portion configured to penetrate at least a portion of tire tread, and a head portion configured to receive impact from an impact driving device.

11. The method of claim 1, wherein at least one impact driven fastener comprises at least one penetrating portion and a head portion, and wherein softening of at least a portion of at least one impact driven fastener caused by application of heat comprises substantially conforming at least the head portion of at least one impact driven fastener to tire tread.

12. The method of claim 1, wherein at least one impact driven fastener comprises at least one penetrating portion and a head portion, and wherein softening of at least a portion of at least one impact driven fastener caused by application of heat comprises separation of the head portion of at least one impact driven fastener from at least one penetrating portion of at least one impact driven fastener.

13. The method of claim 1, wherein at least a portion of the impact driven fastener is black in color.

14. The method of claim 1, wherein the impact driven fastener comprises a staple having a substantially U-shape.

15. The method of claim 1, wherein at least one penetrating portion has a flexural strength greater than about 10,000 psi.

16. The method of claim 1, wherein at least one penetrating portion has a flexural strength greater than about 12,000 psi.

17. The method of claim 1, wherein the plastic of at least one penetrating portion comprises a copolymer of acrylonitrile, butadiene and styrene.

18. The method of claim 1, wherein the plastic of at least one penetrating portion comprises a copolymer of acrylonitrile and styrene.

19. The method of claim 1, wherein the plastic of at least one penetrating portion comprises polystyrene.

20. The method of claim 1, wherein the plastic of at least one penetrating portion comprises poly(styrene acrylonitrile).

21. The method of claim 1, wherein the plastic of at least one penetrating portion comprises poly(methyl methacrylate).

22. The method of claim 1, wherein the plastic of at least one penetrating portion comprises polyvinyl chloride.

23. The method of claim 1, wherein the plastic of at least one penetrating portion comprises polyethylene.

24. The method of claim 1, wherein the plastic of at least one penetrating portion comprises poly(acrylonitrile).

25. The method of claim 1, wherein the plastic of at least one penetrating portion comprises poly (methyl acrylate).

26. The method of claim 1, wherein the plastic of at least one penetrating portion comprises a copolymer of acrylonitrile and methyl acrylate.

27. The method of claim 1, wherein the plastic of at least one penetrating portion comprises at least one reinforcing material.

28. The method of claim 1, wherein the impact driven fastener comprises a thermoset polymer.

29. The method of claim 1, wherein the impact driven fastener is configured to be loaded into an impact fastener driving device.

30. The method of claim 1, wherein the penetrating portion extends from a tip to the head portion.

31. The method of claim 1, wherein the head portion consists essentially of plastic.

32. The method of claim 1, further comprising two penetrating portions.

33. The method of claim 1, further comprising applying pressure greater than about 50 psi to at least partially soften the impact driven fastener,
wherein applying heat to at least partially soften the impact driven fastener comprises heating at least a coupling layer of the tire to a temperature greater than about 180° F.,
wherein the impact driven fastener comprises a staple having at least one penetrating portion configured to penetrate at least a portion of tire tread, and a head portion configured to receive impact from an impact fastener driving device,
wherein the fastener is configured to be loaded into the impact fastener driving device.

34. A method, comprising:
securing a portion of tread to a tire core of a tire using at least one plastic fastener, wherein the plastic fastener comprises a staple having at least two penetrating members coupled to one another via a head portion, wherein at least the head portion of the plastic fastener is configured to soften during heating;
heating at least the head portion of the plastic fastener to soften at least the head portion; and
leaving at least a portion of the plastic fastener attached to the portion of tread and/or the tire core.

35. The method of claim 34, further comprising providing the tire for use including the portion of the plastic fastener attached to the portion of tread and/or the tire core.

36. The method of claim 34, wherein leaving at least a portion of the plastic fastener attached to the portion of tread and/or the tire core comprises leaving the entirety of the plastic fastener in the portion of tread and/or the tire core.

37. The method of claim 34, wherein leaving at least a portion of the plastic fastener attached to the portion of tread and/or the tire core comprises leaving in the tread and/or the tire core at least a portion of a penetrating member of the plastic fastener that is disposed in the tread and/or the tire core.

38. The method of claim 34, wherein leaving at least a portion of the plastic fastener attached to the portion of tread and/or the tire core comprises removing a head portion of the plastic fastener that is substantially exposed and leaving in the tread and/or the tire core a substantial portion of a penetrating member of the plastic fastener that is disposed in the tread and/or the tire core.

39. The method of claim 34, further comprising applying pressure greater than about 50 psi to at least partially soften the plastic fastener,
wherein heating at least the head portion of the plastic fastener to soften at least the head portion comprises heating at least a coupling layer of the tire to a temperature greater than about 180° F.,
wherein the plastic fastener comprises a staple having at least one penetrating portion configured to penetrate at least a portion of the portion tread and/or the tire core, and a head portion configured to receive impact from an impact fastener driving device,
wherein the plastic fastener is configured to be loaded into the impact fastener driving device.

* * * * *